United States Patent
Astrom et al.

(10) Patent No.: US 8,498,632 B2
(45) Date of Patent: Jul. 30, 2013

(54) DETERMINING NETWORK QUALITY

(75) Inventors: Henrik Astrom, Solna (SE); Jan Plasberg, Farsta (SE)

(73) Assignee: Skype, Dublin (IE)

( * ) Notice: Subject to any disclaimer, the term of this patent is extended or adjusted under 35 U.S.C. 154(b) by 85 days.

(21) Appl. No.: 13/160,690

(22) Filed: Jun. 15, 2011

(65) Prior Publication Data

US 2011/0312312 A1    Dec. 22, 2011

(30) Foreign Application Priority Data

Jun. 18, 2010 (GB) .................................. 1010310.9

(51) Int. Cl.
*H04W 88/02* (2009.01)

(52) U.S. Cl.
USPC ...................................................... 455/418

(58) Field of Classification Search
USPC ................ 455/418, 456, 456.3; 709/758–779
See application file for complete search history.

(56) References Cited

U.S. PATENT DOCUMENTS

| | | |
|---|---|---|
| 7,236,767 B1 | 6/2007 | Cankaya et al. |
| 2002/0082044 A1 | 6/2002 | Davenport |
| 2003/0061009 A1 | 3/2003 | Davis et al. |
| 2003/0087635 A1 | 5/2003 | Sheffield |
| 2005/0213511 A1 | 9/2005 | Reece, Jr. et al. |
| 2007/0037570 A1 | 2/2007 | Donovan et al. |
| 2009/0054074 A1 | 2/2009 | Aaron |
| 2009/0154367 A1 | 6/2009 | Aaron et al. |
| 2009/0245118 A1 | 10/2009 | McCormick |
| 2009/0300688 A1 | 12/2009 | Karaoguz et al. |
| 2010/0022263 A1 | 1/2010 | Stamoulis et al. |
| 2010/0054185 A1 | 3/2010 | Kaneko et al. |
| 2012/0201133 A1* | 8/2012 | Raleigh ......................... 370/230 |
| 2012/0210391 A1* | 8/2012 | Raleigh ............................ 726/1 |

FOREIGN PATENT DOCUMENTS

| | | |
|---|---|---|
| DE | 10064955 A1 | 7/2002 |
| EP | 1830596 A1 | 9/2007 |
| GB | 2363034 A | 12/2001 |
| GB | 2423217 A | 8/2006 |
| JP | 2004/228851 A1 | 8/2004 |
| JP | 2005/223611 A1 | 8/2005 |
| JP | 2006/217095 A1 | 8/2006 |
| WO | WO 95/33352 A2 | 12/1995 |
| WO | WO 2010/118379 A1 | 10/2010 |

OTHER PUBLICATIONS

Notification of Transmittal of the International Search Report and the Written Opinion of the International Searching Authority, or the Declaration, from International Application No. PCT/EP2011/059599, Date of Mailing: Sep. 8, 2011, 12 pp.

Search Report under Section 17, Application No. GB1010310.9, Date of Search: Sep. 28, 2011, 2 pp.

* cited by examiner

*Primary Examiner* — Diane Mizrahi

(74) *Attorney, Agent, or Firm* — Wolfe-SBMC

(57) ABSTRACT

Method, communications device and computer program product for determining network quality for the communications device which is capable of communicating over a communications network. The method comprises determining location information associated with a location of the device, querying a database using the determined location information, wherein the database stores a plurality of entries each comprising location information and corresponding network quality information, and obtaining, from the database in response to the query, network quality information from at least one entry of said entries which comprises location information corresponding to the determined location information.

32 Claims, 2 Drawing Sheets

DETERMINING NETWORK QUALITY

RELATED APPLICATION

This application claims priority under 35 U.S.C. §119 or 365 to Great Britain Application No. 1010310.9, filed Jun. 18, 2010. The entire teachings of the above application are incorporated herein by reference.

FIELD OF THE INVENTION

The present invention relates to determining network quality. In particular, the present invention relates to determining network quality for a communications device capable of communicating over a communications network.

BACKGROUND

A communications device can communicate with other communications devices over a communications network. The quality of a communication experienced by a user of the communications device is often dependent upon the network quality experienced by the communications device in the communications network. It can therefore be useful to monitor and/or improve the network quality experienced by the communications device.

A device in a Global System for Mobile Communications (GSM) network has a status bar showing the GSM network quality which is based on the signal strength currently received at the device. The determination of the signal strength and the conversion of this signal strength into a network quality do not always result in an accurate indication of the network quality. Furthermore, most devices do not provide access to network quality information to a user application, and even if they do then it is not possible to predict future quality. Additionally, the quality measure that they show might not be comparable across different devices.

It would be beneficial to improve the determination of the network quality.

SUMMARY

According to a first aspect of the invention there is provided a method of determining network quality for a communications device capable of communicating over a communications network, the method comprising: determining location information associated with a location of the device; querying a database using the determined location information, the database storing a plurality of entries each comprising location information and corresponding network quality information; and obtaining, from the database in response to the query, network quality information from at least one entry of said entries which comprises location information corresponding to the determined location information.

According to a second aspect of the invention there is provided a communications device capable of communicating over a communications network, the device comprising: determining means for determining location information associated with a location of the device; querying means for querying a database using the determined location information, the database storing a plurality of entries each comprising location information and corresponding network quality information; and obtaining means for obtaining, from the database in response to the query, network quality information from at least one entry of said entries which comprises location information corresponding to the determined location information.

According to a third aspect of the invention there is provided a communications network comprising: a communications device according to the second aspect of the invention; and the database.

According to a fourth aspect of the invention there is provided a computer program product comprising computer readable instructions for execution on a communications device capable of communicating over a communications network, the instructions comprising instructions for: determining location information associated with a location of the device; querying a database using the determined location information, the database storing a plurality of entries each comprising location information and corresponding network quality information; and obtaining, from the database in response to the query, network quality information from at least one entry of said entries which comprises location information corresponding to the determined location information.

Local network quality is determined based on location information, preferably provided from a client running on the device. A database is compiled preferably from reports from clients running on mobile devices that report location information (determined using e.g. a Global Positioning System (GPS), measured signal strengths to base stations in the communications network, or a determination of the WiFi networks that are visible) together with statistics about the network quality and any problems at that location (e.g. call drops, long data Round Trip Times (RTTs), low bandwidth, etc) and other statistics about the network (e.g. the network operator and network type used such as GSM, Edge, 3G, High-Speed Downlink Packet Access (HSDPA), etc). The database may then be queried frequently by the client on a mobile device using current location data to predict the local network quality, and how the network quality is likely to change with the current movement of the mobile device. As well as querying the database with the determined location information the database can be queried using further information determined at the device (e.g. other device-local information), such as the speed of the device, the direction of movement of the device, the network operator used by the device, the network type used by the device, the type of the device itself and the date and time at which the network quality information is required.

Based on the data with which the device queries the database, an entry is obtained from the database which includes data which corresponds to the data in the query. More than one entry may be obtained from the database, and in some embodiments a function of several database entries is used to calculate network quality. For example a database server could choose all the entries within a certain geographical distance around the device's location and/or time of day and/or operator, etc. The function may be implemented by the database server. In these embodiments an intelligent database server is used to choose the entries from the database. The function might be adapted consequently such that the accuracy of the determination of the network quality can be improved. Alternatively, the function might not be changed.

The network quality information may be used to notify the user of possible current and future network problems. The client (e.g. a Skype™ client) may adapt the call control implemented at the device according to the obtained network quality information, for example by increasing timeouts for calls that are dropped.

There is provided a method of determining network quality by a simple process of querying a database. This does not require knowledge about the signal strength or location of cell towers (or base stations), which are parameters that are normally not available for the application layer. The application layer would normally have to query another layer (e.g. the data layer) in order to determine these parameters. In contrast, and advantageously, the method described herein of determining network quality by querying a database can be implemented by the application layer alone, i.e. without requiring any information from other layers. However, the predictions could be improved if lower layer information is available. Also, it is possible to predict cases where the signal strength changes very quickly. One scenario where this happens would be when the device moves into a tunnel.

A user of a device can therefore determine a network quality at a particular location based on the network quality experienced by other devices at the location. Querying the database is a simple process. The location at which the network quality is determined may be the current location of the device. The location at which the network quality is determined may be a future location of the device. Furthermore, the determined network quality may depend upon the direction and speed of movement of the device or the network operator and network type used by the device. In this way changes in the network quality experienced by the device can be predicted.

The database may be stored centrally in the communications network. The database may be stored on the device.

BRIEF DESCRIPTION OF THE DRAWINGS

For a better understanding of the present invention and to show how the same may be put into effect, reference will now be made, by way of example, to the following drawings in which.

DETAILED DESCRIPTION OF PREFERRED EMBODIMENTS

Figure 1:
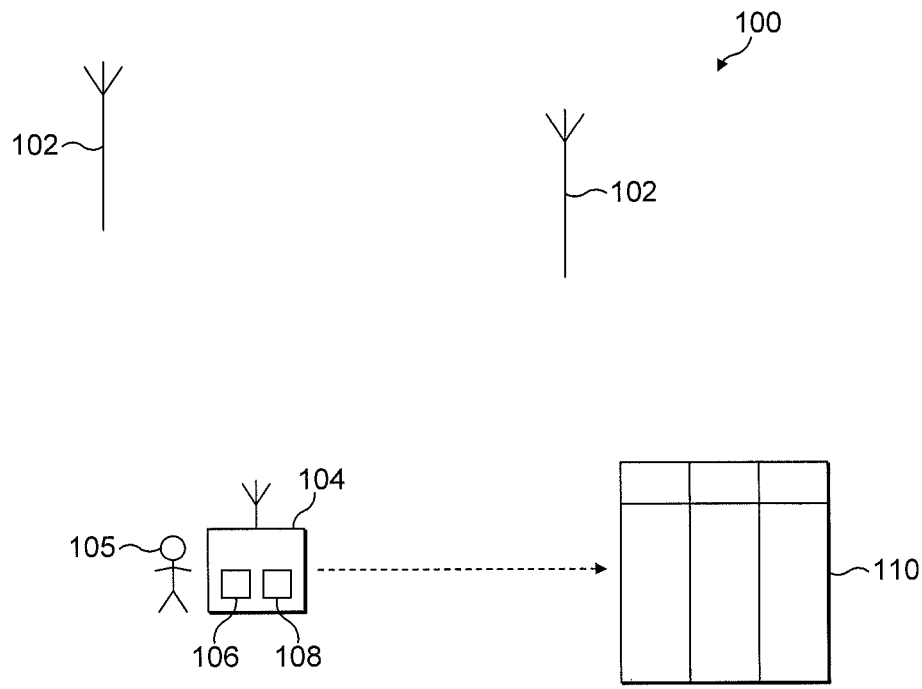
FIG. 1 is a schematic representation of a communications network according to a preferred embodiment.

With reference to FIG. 1 there is now described a preferred embodiment of the communications network 100. The specific details of the communications network 100 are given herein by way of example only, and are not limiting on the scope of protection, which is defined by the appendant claims. Communications network 100 comprises a plurality of base stations 102 which communicate with a communications device 104. The device 104 is usable by a user 105 for communicating over the network 100. The device 104 comprises a CPU 106 and a memory 108 for processing and storing information respectively. The network 100 also comprises a database 110 from which the device 104 can obtain information. In the preferred embodiment shown in FIG. 1 the database 110 is stored centrally in the network 100 (i.e. at a node that is separate from the device 104). In alternative embodiments, the database 110 is stored on the device 104.

The device 104 can communicate over the network by sending and receiving signals to and from the base stations 102. The network quality experienced by the device 104 when communicating over the network 100 is dependent upon the transmission of the signals between the device 104 and the base stations 102. The transmission of signals between the device and a base station 102 is dependent upon the distance between the device and the base station 102 and also dependent upon other factors, such as the local geography of the area and whether there are any obstacles obstructing the transmission of the signals, and the level of background noise.

The network 100 is a wireless data network such as 4G, 3G, Edge or Wimax and the connectivity between the device 104 and a base station 102 is particularly dependent on the location of the device 104. When the user 105 is on the move (taking the device 104 with him) it is likely that a handover from one base station 102 to another base station 102 has to be performed, or that the user 105 (and therefore the device 104) moves to an area without network coverage. A handover gives a disruption of service for a significant time interval causing quality problems for real-time services like Voice over Internet Protocol (VoIP).

Knowledge about network quality as a function of position in the network 100 is useful. This knowledge can be built up as devices communicate over the network 100. A device 104 communicating over the network can monitor the behaviour (i.e. the network quality it experiences) during calls and/or other occasions when a data connection over the network 100 is used, such as for example during file transfer. During communication over the network 100 a device can record its location and the network quality it experiences during the communication. When a problem occurs on the network 100 during a communication (e.g. a call is dropped, a high data round trip time is experienced or severe packet losses occur) that problem is preferably also recorded. The recorded information (good and/or bad behaviours in the network) is submitted to the database 110 in which it is stored. The database 110 includes a plurality of entries comprising information which has been recorded by devices in the network 100 during communication over the network 100. The entries in the database 110 include information such as date, location, direction of movement of the device, speed of movement of the device, operator used, type of network used, bandwidth and type of problem(s) occurring in the network.

Figure 3:
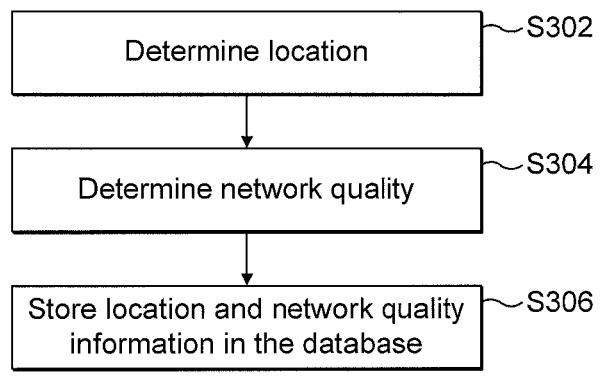
FIG. 3 is a flow chart for a process of storing data in a database according to a preferred embodiment.

In relation to FIG. 3 there is now described a method of the device 104 storing data in the database 110 according to a preferred embodiment. In step S302 the device 104 determines location information associated with a location of the device 104. The location information can be determined in a plurality of ways as is known in the art. For example, many known devices have built-in ways to determine the location information using technologies such as a Global Positioning System (GPS), using measured signal strengths to the base stations 102 to estimate the location of the device 104, or using information on which WiFi (Wireless Fidelity) networks (which have known locations) are visible to the device 104. These are examples of automated methods by which the device 104 can determine location information associated with the current location of the device 104.

Alternatively, the user 105 of the device 104 may input the location information to the device 104 if the user can accurately input the current location of the device 104. It will be apparent that the location information may precisely identify the actual location of the device 104, or alternatively the location information may identify a region in which the device 104 is located. For a example where the location information is determined based on which Wireless base stations are visible, the location information may represent a relatively large region within which the device 104 is located, whereas where the location information is determined using a GPS, the location information may represent a relatively small region within which the device 104 is located such that the location information more precisely identifies the actual location of the device 104. In this way the location information is associated with the location of the device 104 without necessarily precisely identifying the actual location of the device 104 in some cases.

In step S304 the device 104 determines network quality information associated with the network quality it experiences at its location when it communicates over the network 100. The network quality information may include various pieces of information describing the quality of a communication, such as the signal strength, the bandwidth, the data round trip time, the packet loss rate, etc.

In step S306 the determined location information and the determined network quality information is stored in the database 110. This is shown in FIG. 1 by the dashed line between the device 104 and the database 110. As described above, the database 110 is preferably stored centrally in the network 100, separate from the device 104. As described above the information recorded by the device 104 with regards to the network quality information experienced by the device 104 at the location associated with the determined location information is stored in an entry in the database 110. Other pieces of information may also be stored in the entry in the database 110. For example, as described above, the entry may also store information regarding the date at which the information was determined, the direction and speed of movement of the device 104 as the information was determined, the network operator and the type of network used in the communication for which the network quality was determined, the bandwidth of the communication and any network problems that were experienced during the communication. The entry may also store information regarding the device that was used when the network quality was determined since the network quality might be device dependent. For example, the entry may include information indicating the model of the device used to determine the rest of the information in the entry, e.g. as "device model=iphone 3GS".

The database 110 therefore stores a plurality of entries, recorded by devices operating in the network 100, the entries storing information regarding the network quality experienced by devices at different locations in the network and under different conditions (e.g. different network operators and different speeds/direction of movement). The information in the database 110 can therefore be used to determine the network quality that will be experienced by a device 104 in the network 100 given the device's location and preferably also given the device's conditions (e.g. network operator and speed/direction of movement, type of device, etc). Therefore, as described in more detail below, by using the location and the direction and speed of the device 104 it is possible to predict future network disruptions (or problems) and to notify the user 105 about the likelihood of a disruption and/or adapt the operation of the device 104 to better deal with the local deficiencies of the network 100.

Figure 2:
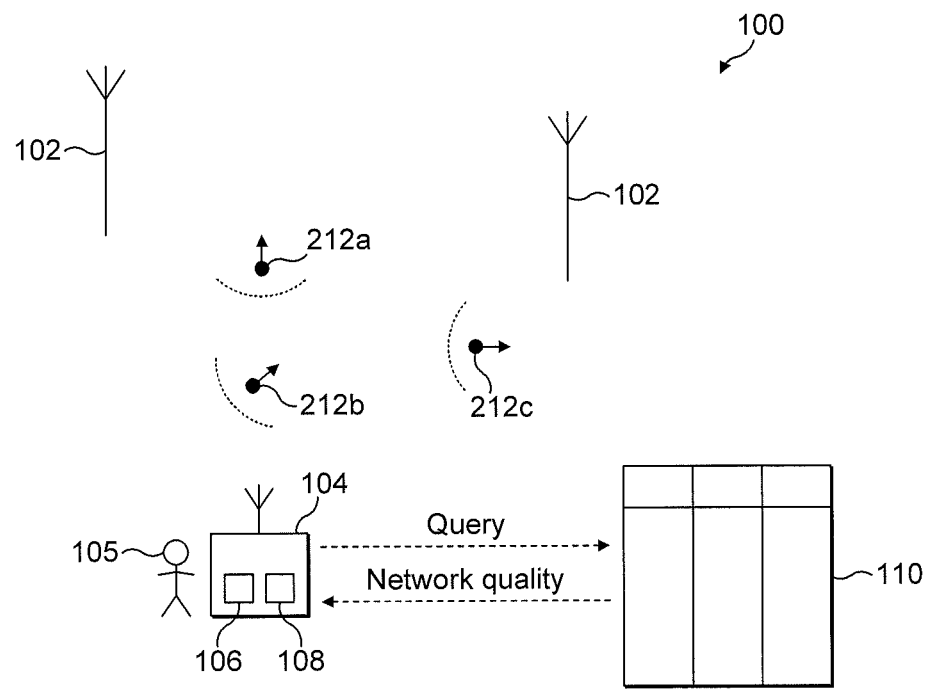
FIG. 2 is a second schematic representation of the communications network according to a preferred embodiment.

FIG. 2 shows the communications network 100 of FIG. 1 comprising the base stations 102, the database 110 and the communications device 104, usable by the user 105, which comprises the CPU 106 and the memory 108. Also shown in FIG. 2 are problem points 212 in the network 100. Three problem points are shown in FIG. 2 and are denoted 212*a*, 212*b* and 212*c*. The problem points 212 are recorded in the database 110 and are locations in the network 100 at which network problems have been recorded, as described above.

Figure 4:
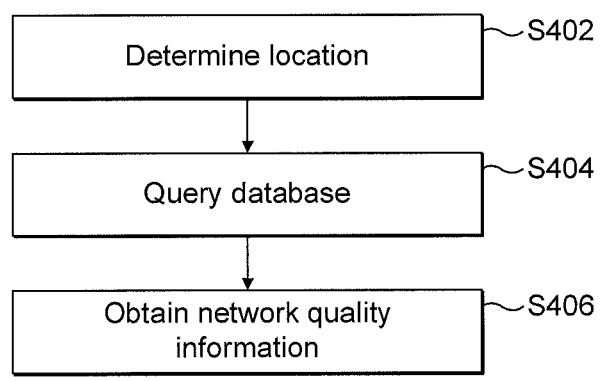
FIG. 4 is a flow chart for a process of determining network quality according to a preferred embodiment.

In relation to FIG. 4 there is now described a method of determining network quality according to a preferred embodiment. In step S402 the device 104 determines location information associated with a location of the device 104. Step S402 corresponds with step S302 described above, and the location information can be determined in a plurality of ways as is known in the art. For example, many known devices have built-in ways to determine the location information using technologies such as a GPS, using signal strengths to the base stations 102 to estimate the location of the device 104, or using information on which WiFi networks (which have known locations) are visible to the device 104. These are examples of automated methods by which the device 104 can determine location information associated with the current location of the device 104.

Alternatively, the user 105 of the device 104 may input the location information to the device 104. In this way the location information can be associated with any location that the user 105 decides to input. For example, the location information may be associated with a future location of the device 104. In this way the user 105 can use the method described below to predict the network quality that will be experienced at some point in the future when the device 104 is at the future location.

In step S404 the user 105 decides to use a service such as calling over the communications network 100, and the device 104 queries the database 110 for locations in close proximity to the location associated with the determined location information. The query can also include constraints on which network operator is used by the device 104 and the date and/or time that the entry in the database 110 was recorded. The query is represented in FIG. 2 by a dashed line from the device 104 to the database 110.

In step S406 the user device 104 obtains network quality information from the database 110 in response to the query in step S404. This is represented in FIG. 2 by a dashed line from the database 110 to the device 104. The obtained network quality information comes from an entry (or multiple entries) in the database 110 which comprises location information corresponding to the location information determined in step S402. The location information in an entry from which the network quality information is obtained may be exactly the same as the determined location information. For example, the location information stored in the entry may have been determined using GPS from a device at a particular location and the location information for the device 104 querying the database 110 determined in step S402 may also have been determined using GPS from the same location. Alternatively, the location information in an entry from which the network quality information is obtained may not be exactly the same as the determined location information. For example, the location information stored in the entry may have been determined using signal strengths at a particular location to base stations 102 in the network 100 and the location information for the device 104 querying the database 110 determined in step S402 may have been determined by seeing which WiFi networks are visible. In this sense the location information determined in step S402 will not exactly match that stored in the database entry, but if both pieces of location information describe the same location then they can be considered to correspond to each other. Therefore when querying the database 110 using location information determined using one particular method (e.g. GPS) the entries from which the network quality information can be obtained are not limited to those in which the location information was also determined using the particular method (e.g. GPS), and the network quality information could be obtained from an entry (or entries) in the database in which the location information was determined using a different method (e.g. using signal strengths to base stations), provided that the location information in the entry corresponds with that in the query (i.e. they both relate to the same location in the network).

There is therefore described above a method in which the device 104 can query the database 110 in order to determine the network quality as a function of location in the network 100. The database 110 stores entries recorded by devices in the network 100. In this way, the entries are representative of real network quality experienced in the network 100. This is in contrast to estimating the network quality in the network 100. By using the database which stores the actual network quality experienced at different locations in the network a more reliable determination of the network quality as a function of location can be provided to device 104 in response to a query.

The database entries can be used to determine problem points in the network 100 that are likely to give network quality problems. As shown in FIG. 2, before or during a call, or other communication event, the device 104 can query the database 110 to determine nearby problem points in the network. In response to the query the database 110 will notify the device 104 of the problem points 212a, 212b and 212c. The device 104 can be warned of a network problem when the device 104 moves into the problem regions denoted by the dotted lines, in the direction of travel denoted by the arrows, towards a problem point 212 (see FIG. 2).

During a call, or another communication event, the device 104 can continuously track its location through the network 100. The network quality information obtained from the database 110 can be used in different ways as described below. For example, the network quality information obtained from the database 110 can be used when the device 104 approaches a known problem point 212 in the network 100.

As described above a plurality of entries can be obtained from the database based on the data with which the database is queried. A function of the entries can be used to determine the network quality for the device querying the database. Those entries which have similar location information and similar other information (e.g. speed and direction of movement, network type and operator and device type) can be chosen from the database and combined according to the function to provide a determination of the network quality for the querying device. By using multiple entries a more accurate determination of the network quality can be provided. The effects of an error in an entry will be reduced by taking multiple entries into account. The exact function used may be improved or changed. This improvement or change of the function may be performed using a determination of how accurately the network quality is determined for a querying device.

The obtained network quality information can be used to notify the device 104 and/or the user 105 of the network quality at the location of the device 104. The device 104 and/or the user 105 can be notified of the problem points 212 using an indicator to indicate that the network quality will most likely degrade if the device 104 continues moving in the current direction.

The obtained network quality information can also be used to provide a map that can be displayed to the user 105 (e.g. using a display of the device 104) showing the network quality in the region. The map can be useful for the user 105 in determining where to move whilst engaging in a communication session over the network 100.

Furthermore, if the user 105 queries the database 110 and specifies a location, e.g. a location at which the device 104 is intended to be used, the user can be notified (e.g. by the display of the map) whether there are likely to be any network problems at that location. Since the query can also include an indication of the network operator, it is possible for the device 104 and/or user 105 to be notified of the network quality and any network problems experienced at a location specified in the query when a number of different network operators are used. Furthermore, the user 105 can be advised as to which network operator to use, and which not to use, at a particular location, based on the information stored in the database 110.

If the device is to be used predominantly at one location, that predominant location can be determined (e.g. either by the device 104 determining based on past history where the device 104 is predominantly used, or by the user 105 inputting information specifying the predominant location). It is then possible to use the information stored in the database 110 to determine which network operator would be best to use at that predominant location. For example, where the device 104 is predominantly used at the user's home then the user can be advised to use a network operator which provides the best network quality and/or the least network problems at that location based on the information stored in the database 110. In other words, it is possible to assist users in network or operator selection, such that users who mainly use the service in a similar area can be notified if entries in the database 110 show that it would give better quality to switch to a different operator.

If a call drop, or other network problem, occurs when the device 104 is communicating over the network 100, the device 104 and/or the user 105 can be notified that the call drop, or other network problem, is most likely due to a problem at the current location in the network 100 if the database 110 indicates that similar problems have occurred for other devices in the network at the same location. More generally when the obtained network quality information indicates that a call quality is likely to be reduced at the location of the device the method further comprises notifying the user that a reduction in call quality is likely to be caused by network problems.

In general network quality (of any sort) can be recorded. This may involve recording particularly bad conditions as described above. This may also involve recording particularly good conditions, such that the entries in the database can also store areas or times at which a particularly good network condition is experienced (e.g. a particularly high network quality, a particularly low level of packet losses in the network, a particularly high bandwidth or a lower than usual data Round Trip Time). Therefore, it is not only problems in the network which are indicated in the entries in the database, any type of network quality can be indicated in the entries, including locations of good quality. Information can be provided to the user of the device to inform him of the network quality at a particular location, for example the user may be informed where particularly good areas of network quality may be expected.

As well as notifying the device 104 and/or the user 105 of the obtained network quality, the obtained network quality can be used to adapt the call control implemented at the device 104. Call control is the way in which calls (and other communications over the network) are handled by the device 104. The call control may be implemented using a client on the device 104 (e.g. a software client). The call control can adapt local parameters at the device 104 such as (but not limited to) the bandwidth used in a communication, the forward error correction scheme used and the packet sizes used in the communication to thereby better deal with local network behaviour. In this way the communication can be adapted in dependence upon the network quality at the device's location, such that the communication can be optimized. Furthermore, any network problems can be predicted and the detrimental effects of the network problems can be reduced or prevented. The call control can be adapted such that where network problems have been identified in the device's location the length of a time out which would cause a call to be dropped is adjusted.

As well as adapting the call control implemented at the device 104, when the device 104 is engaged in a communication session over the network with another device, the device 104 can notify the other device in the session of the likelihood of a temporary disruption of service (where the information in the database indicates the presence of network problems at the location of the device 104) so that the communication is not considered dropped even if data is not received for a significantly longer time interval than usual. In general, the device 104 can notify the other device of the obtained network quality information.

In the methods described above the entries in the database 110 are populated by devices in the network 100 as they experience network quality at different locations in the network 100. In other embodiments the database 110 may be populated with geographical network quality information gathered from the network operator.

The database 110 can be updated with new entries to reflect the recent network quality throughout the network 100. Where the database 110 is stored locally on the device 104 the network operator may load the entries into the database 110. The network quality information retrieved from the database 110 by the device 104 may be used together with network quality information provided by the operating system of the device. In preferred embodiments the device 104 is a mobile device 104 that can move throughout the network. In other embodiments, the device 104 is a fixed device that is fixed at a particular location in the network 100. The methods described above are useful for use with a fixed device to allow the user 105 to determine the network quality by querying the database 110. The methods described above take account of the fact that the user application normally does not have network quality information available. The methods described above also might be able to give a better estimate of network quality compared to prior art methods. Furthermore, the methods described above allow network quality to be predicted before a fixed device is installed in the network so the user 105 can determine what the network quality will be when the fixed device is installed (e.g. at his home). Furthermore, for a fixed device it is useful to determine which network operator will provide the greatest network quality at the location of the fixed device, as described above.

The method steps described above and shown as steps S302 to S306 and S402 to S406 in FIGS. 3 and 4 are preferably implemented in software, which can be executed on the database server, which itself might not be on the device 104. Alternatively, such software could be executed on the CPU 106 and may use the memory 108 of the device 104. The method steps may be encoded as instructions in a computer program product which is readable by the CPU 106. The method steps may alternatively be implemented in hardware block as would be apparent to a person skilled in the art.

While this invention has been particularly shown and described with reference to preferred embodiments, it will be understood to those skilled in the art that various changes in form and detail may be made without departing from the scope of the invention as defined by the appendant claims.

The invention claimed is:

1. A method of determining network quality for a communications device capable of communicating over a communications network, the method comprising:
    determining location information associated with a location of the communications device;
    querying a database using the determined location information, the database storing a plurality of entries each comprising location information and corresponding network quality information;
    obtaining, from the database in response to the query, network quality information from at least one entry of said entries which comprises location information corresponding to the determined location information; and
    enabling adapting a call control implemented at the communications device based, at least in part, on the obtained network quality.

2. The method of claim 1 wherein obtaining the network quality information further comprises obtaining the network quality information from a plurality of said entries which comprise location information corresponding to the determined location information.

3. The method of claim 1 further comprising querying the database using further information associated with the communications device other than the location information, wherein the at least one entry comprises further information corresponding to the further information associated with the communications device.

4. The method of claim 3 wherein the further information is at least one of:
    i) network operator information;
    ii) network type information;
    iii) information regarding the type of the communications device;
    iv) information regarding speed;
    v) information regarding direction of movement; or
    vi) date and time at which the network quality information is required.

5. The method of claim 1 further comprising notifying a user of the communications device of the obtained network quality information.

6. The method of claim 5 further comprising displaying a map to the user showing the network quality at different locations.

7. The method of claim 5 wherein the method further comprises:
    responsive to obtaining network quality information that indicates a call quality is likely to be reduced at the location of the communications device, notifying the user that a reduction in call quality is likely to be caused by network problems.

8. The method of claim 5 further comprising advising the user as to which network operator to use based on the obtained network quality information.

9. The method of claim 1 further comprising determining a predominant location of the communications device, wherein said location information is associated with the predominant location of the communications device such that the obtained network quality information corresponds with the predominant location of the communications device.

10. The method of claim 1 wherein the adapting the call control comprises adjusting the length of a time out which would cause a call to be dropped.

11. The method of claim 1 wherein the adapting the call control comprises adjusting local parameters at the communications device.

12. The method of claim 11 wherein the local parameters comprise at least one of the bandwidth, the forward error correction scheme and the packet sizes used by the communications device in a communication over the communications network.

13. The method of claim 1 further comprising notifying, over the communications network, a further communications device of the obtained network quality information.

14. The method of claim 1 wherein the location information is associated with a current location of the communications device.

15. The method of claim 1 wherein the location information is associated with a future location of the communications device.

16. The method of claim 1 wherein determining the location information comprises at least one of:
   i) using a Global Positioning System,
   ii) using signal strengths to base stations in the communication network, or
   iii) determining which WiFi networks are visible.

17. The method of claim 1 wherein the entries in the database further comprise at least one of:
   i) operator information,
   ii) information regarding a network problem that has occurred at the location,
   iii) information regarding speed,
   iv) information regarding direction of movement,
   v) information regarding a network operator,
   vi) information regarding a network type, or
   vii) date and time at which the information in the entry was determined.

18. The method of claim 1 wherein querying the database further comprises querying a database that is stored centrally in the communications network.

19. The method of claim 1 wherein querying the database further comprises querying a database stored on the communications device.

20. The method of claim 1 wherein the communications device is a mobile communications device.

21. The method of claim 1 wherein the communications device is a fixed communications device.

22. A communications device capable of communicating over a communications network, the communications device comprising:
   at least one processor; and
   computer-readable storage memory comprising at least some processor-executable instructions, the processor-executable instructions configured to, at least in part, enable:
      determining location information associated with a location of the communications device;
      querying a database using the determined location information, the database storing a plurality of entries each comprising location information and corresponding network quality information;
      obtaining, from the database in response to the query, network quality information from at least one entry of said entries which comprises location information corresponding to the determined location information; and
      adapting a call control implemented at the communications device based, at least in part, on the obtained network quality.

23. The communication device of claim 22 further comprising the database.

24. The communications device of claim 22 wherein the communications device is a mobile communications device.

25. The communications device of claim 22 wherein the communications device is a fixed communications device.

26. A communications network comprising:
   a mobile communications hardware device configured to:
      access a database storing a plurality of entries each comprising location information and corresponding network quality information;
      determine location information associated with a location of the mobile communications device;
      query the database using the determined location information;
      obtain, from the database in response to the query, network quality information from at least one entry of said entries which comprises location information corresponding to the determined location information; and
      adapt a call control implemented at the mobile communications device in dependence upon the obtained network quality.

27. A computer program product comprising computer readable instructions stored on computer readable storage memory which, responsive to execution on a communications device capable of communicating over a communications network, implement a method comprising:
   determining location information associated with a location of the communications device;
   querying a database using the determined location information, the database storing a plurality of entries each comprising location information and corresponding network quality information;
   obtaining, from the database in response to the query, network quality information from at least one entry of said entries which comprises location information corresponding to the determined location information; and
   adapting a call control implemented at the communications device based, at least in part, on the obtained network quality.

28. A computer-implemented method comprising:
   generating, using a communications device configured to communication over a communications network, location information associated with a current location of the communications device;
   generating, using the communications device, network quality information associated with the communications device, the network quality information based, at least in part, on a network quality experienced by the communications device at said current location, the network quality being associated with the communications network; and
   storing, using the communications device, the location information and network quality information associated with the communications device in at least one entry of a plurality of entries associated with a database, each said entry comprising location information and corresponding network quality information.

29. The computer-implemented method as recited in claim 28 further comprising monitoring, using the communications device, a network quality associated with the communications device when a data connection is used over the communications network.

30. The computer-implemented method as recited in claim 28 further comprising storing in an entry of the plurality of entries associated with the database, using the communications device, information associated with experiencing a network problem.

31. The computer-implemented method of claim 30, wherein the network problem is at least one of:
  i) a dropped call,
  ii) a higher than usual data Round Trip Time, or
  iii) severe packet losses in the communications network.

32. The computer-implemented method of claim 28 further comprising storing in an entry of the plurality of entries associated with the database, using the communications device, information associated with experiencing a particularly good network condition.

* * * * *